United States Patent
Ishizaki

(10) Patent No.: US 9,891,925 B2
(45) Date of Patent: *Feb. 13, 2018

(54) ALLOCATION METHOD, APPARATUS, AND PROGRAM FOR MANAGING ARCHITECTURAL REGISTERS AND PHYSICAL REGISTERS USING MAPPING TABLES

(71) Applicant: INTERNATIONAL BUSINESS MACHINES CORPORATION, Armonk, NY (US)

(72) Inventor: Kazuaki Ishizaki, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/285,909

(22) Filed: Oct. 5, 2016

(65) Prior Publication Data

US 2017/0024214 A1    Jan. 26, 2017

Related U.S. Application Data

(63) Continuation of application No. 14/321,852, filed on Jul. 2, 2014, now Pat. No. 9,542,185.

(30) Foreign Application Priority Data

Jul. 19, 2013    (JP) .................. 2013-150697

(51) Int. Cl.
  *G06F 9/38* (2006.01)
  *G06F 9/30* (2006.01)
  *G06F 9/45* (2006.01)

(52) U.S. Cl.
  CPC ............. *G06F 9/384* (2013.01); *G06F 8/441* (2013.01); *G06F 9/3012* (2013.01)

(58) Field of Classification Search
  CPC .................................. G06F 8/441; G06F 9/384
  See application file for complete search history.

(56) References Cited

U.S. PATENT DOCUMENTS 6,330,661 B1 * 12/2001 Torii ..................... G06F 9/3828
                                                            712/228
7,386,843 B2 * 6/2008 Tarditi .................... G06F 8/441
                                                            717/151

(Continued)

FOREIGN PATENT DOCUMENTS

JP    1993-0020089 A    1/1993
JP    1993-0158707 A    6/1993

(Continued)

OTHER PUBLICATIONS

Briggs et al., Coloring Heuristics for Register Allocation, 2004, Houston TX.

(Continued)

*Primary Examiner* — Jacob A Petranek
(74) *Attorney, Agent, or Firm* — Rabin Bhattacharya

(57) ABSTRACT

An allocation system and a method for allocating an architectural register in a system having one or more mapping tables. When the allocation system detects a plurality of available architectural registers to an allocation target virtual register, it identifies adjacent instructions to all instructions having the allocation target virtual register in its destination operand, counts the number of uses of the architectural register appearing in the destination operand for each architectural register, summing the number of uses for each architectural register for each entry group in one or more mapping tables having the same assignment rule for correlations with the architectural registers, calculating the total of the numbers of uses of entries for each entry group, and allocating the architectural register to the allocation target (Continued)

| Architectural Register | Physical Register | |
|---|---|---|
| 4 | 20 | |
| 8 | 23 | } 402 |
| | | |
| 1 | 11 | |
| 9 | 6 | } 404 |
| | | |

400 virtual register such that the total of the numbers of uses of entries for each entry group approaches uniformity.

20 Claims, 8 Drawing Sheets

(56) References Cited

U.S. PATENT DOCUMENTS

| | | | | |
|---|---|---|---|---|
| 7,681,187 | B2* | 3/2010 | Ludwig | G06F 8/441 717/151 |
| 8,555,270 | B2* | 10/2013 | Nakaike | G06F 8/433 717/157 |
| 2004/0015901 | A1* | 1/2004 | Koseki | G06F 8/441 717/140 |
| 2004/0268093 | A1* | 12/2004 | Samra | G06F 9/30181 712/217 |
| 2010/0095286 | A1* | 4/2010 | Kaplan | G06F 8/441 717/156 |
| 2013/0139135 | A1* | 5/2013 | Ditu | G06F 8/441 717/156 |
| 2013/0198728 | A1* | 8/2013 | Vick | G06F 8/441 717/148 |

FOREIGN PATENT DOCUMENTS

| | | |
|---|---|---|
| JP | 2000-0298589 A | 10/2000 |
| JP | 2003-0099249 A | 4/2003 |
| JP | 2004-0533689 T | 11/2004 |
| JP | 2007-0018220 A | 1/2007 |
| JP | 2007-0520768 T | 7/2007 |
| JP | 2008-0269474 A | 11/2008 |
| JP | 2011-0018120 A | 1/2011 |
| JP | 2011-0181114 A | 9/2011 |

OTHER PUBLICATIONS

Maeda et al., "Detailed Multi-Bank Register File Design for Superscalar Processors" IEICE Technical Report, p. 1-6, vol. 104, No. 241. Jul. 25, 2004.

* cited by examiner

```
// FPR1, FPR3, FPR5, FPR7
// have been assigned by global register allocator
// FPRxx is architectural register
// FPR_09xx is virtual floating-point register 1   0x20061ae4ece   LD      FPR_0981,0(GPR4,GPR7)
2   0x20061ae4ed2   LD      FPR_0967,24(GPR10,GPR6)
3   0x20061ae4ed6   LD      FPR9,0(GPR10,GPR8)
4   0x20061ae4eda   LDR     FPR0,FPR_0967
5   0x20061ae4edc   LDR     FPR_0980,FPR_0978
6   0x20061ae4ede   MDBR    FPR9,FPR3
7   0x20061ae4ee2   MDBR    FPR_0967,FPR1
8   0x20061ae4ee6   MDBR    FPR0,FPR3
9   0x20061ae4eea   MDBR    FPR_0980,FPR1
10  0x20061ae4eee   SDBR    FPR9,FPR_0967
11  0x20061ae4ef2   ADBR    FPR0,FPR_0980
12  0x20061ae4ef6   SDBR    FPR_0981,FPR_0978
13  0x20061ae4efa   STD     FPR_0981,0(GPR10,GPR8)
14  0x20061ae4efe   LD      FPR4,24(GPR4,GPR6)
15  0x20061ae4f02   SDBR    FPR4,FPR_0977
16  0x20061ae4f06   STD     FPR4,24(GPR10,GPR6)
17  0x20061ae4f0a   ADB     FPR9,0(GPR4,GPR7)
18  0x20061ae4f10   STD     FPR9,0(GPR4,GPR7)
19  0x20061ae4f14   ADB     FPR0,24(GPR4,GPR6)
20  0x20061ae4f1a   STD     FPR0,24(GPR4,GPR6)
```

FIG. 3

| Architectural Register | Physical Register | |
|---|---|---|
| 4 | 20 | } 402 |
| 8 | 23 | |
|  |  | |
| 1 | 11 | } 404 |
| 9 | 6 | |
|  |  | |

FIG. 4A

| Architectural Register | Physical Register | |
|---|---|---|
| 4 | 20 | } 408 |
| 8 | 23 | |
|  |  | |

| Architectural Register | Physical Register | |
|---|---|---|
| 1 | 11 | } 412 |
| 9 | 6 | |
|  |  | |

FIG. 4B

```
// spec/benchmarks/scimark/fft/FFT.transform_internal([DI])V
// dual > 1
for (int b = 0; b < n; b += 2 * dual) {
    int i = 2 * (b+a);
    int j = 2 * (b+a+dual);

double z1_real = data[j] ;
    double z1_imag = data[j+1] ;

double wd_real = w_real * z1_real - w_imag * z1_imag ;
    double wd_real = w_real * z1_imag + w_imag * z1_real ;

data[j]   = data[i]   - wd_real ;
    data[j+1] = data[i+1] - wd_imag ;
    data[i]   += wd_real ;
    data[i+1] += wd_imag ;
}
```

FIG. 6

```
// FPR_09xx is virtual floating-point register 1   0x20061ae4ece   LD     FPR_0981,0(GPR4,GPR7)      ;
 2   0x20061ae4ed2   LD     FPR_0967,24(GPR10,GPR6)    ;
 3   0x20061ae4ed6   LD     FPR_0978,0(GPR10,GPR8)     ;
 4   0x20061ae4eda   LDR    FPR_0977,FPR_0967          ;
 5   0x20061ae4edc   LDR    FPR_0980,FPR_0978          ;
 6   0x20061ae4ede   MDBR   FPR_0978,FPR_0964          ;
 7   0x20061ae4ee2   MDBR   FPR_0967,FPR_0963          ;
 8   0x20061ae4ee6   MDBR   FPR_0977,FPR_0964          ;
 9   0x20061ae4eea   MDBR   FPR_0980,FPR_0963          ;
10   0x20061ae4eee   SDBR   FPR_0978,FPR_0967          ;
11   0x20061ae4ef2   ADBR   FPR_0977,FPR_0980          ;
12   0x20061ae4ef6   SDBR   FPR_0981,FPR_0978          ;
13   0x20061ae4efa   STD    FPR_0981,0(GPR10,GPR8)     ;
14   0x20061ae4efe   LD     FPR_0987,24(GPR4,GPR6)     ;
15   0x20061ae4f02   SDBR   FPR_0987,FPR0977           ;
16   0x20061ae4f06   STD    FPR_0987,24(GPR10,GPR6)    ;
17   0x20061ae4f0a   ADB    FPR_0978,0(GPR4,GPR7)      ;
18   0x20061ae4f10   STD    FPR_0978,0(GPR4,GPR7)      ;
19   0x20061ae4f14   ADB    FPR_0977,24(GPR4,GPR6)     ;
20   0x20061ae4f1a   STD    FPR_0977,24(GPR4,GPR6)     ;
```

FIG. 7

```
// FPR_0963->FPR1, FPR_0964->FPR3, FPR5, FPR7
// have been assigned by global register allocator
// FPRxx is architectural register
// FPR_09xx is virtual floating-point register 1   0x20061ae4ece   LD     FPR4,0(GPR4,GPR7)     ; = data[i]
2   0x20061ae4ed2   LD     FPR8,24(GPR10,GPR6)   ; = data[j]
3   0x20061ae4ed6   LD     FPR2,0(GPR10,GPR8)    ; = data[j+1]
4   0x20061ae4eda   LDR    FPR0,FPR8             ; z1_real=
5   0x20061ae4edc   LDR    FPR6,FPR2             ; z1_imag=
6   0x20061ae4ede   MDBR   FPR2,FPR3             ; wd_real * z1_real
7   0x20061ae4ee2   MDBR   FPR8,FPR1             ; wd_imag * z1_imag
8   0x20061ae4ee6   MDBR   FPR0,FPR3             ; wd_real * z1_imag
9   0x20061ae4eea   MDBR   FPR6,FPR1             ; wd_imag * z1_real
10  0x20061ae4eee   SDBR   FPR2,FPR8             ; wd_real=...
11  0x20061ae4ef2   ADBR   FPR0,FPR6             ; wd_imag=...
12  0x20061ae4ef6   SDBR   FPR4,FPR2
13  0x20061ae4efa   STD    FPR4,0(GPR10,GPR8)    ; data[j] =
14  0x20061ae4efe   LD     FPR4,24(GPR4,GPR6)    ; = data[i+1]
15  0x20061ae4f02   SDBR   FPR4,FPR0
16  0x20061ae4f06   STD    FPR4,24(GPR10,GPR6)   ; data[j+1] =
17  0x20061ae4f0a   ADB    FPR2,0(GPR4,GPR7)     ; += data[i]
18  0x20061ae4f10   STD    FPR2,0(GPR4,GPR7)     ; data[i] =
19  0x20061ae4f14   ADB    FPR0,24(GPR4,GPR6)    ; += data[i+1]
20  0x20061ae4f1a   STD    FPR0,24(GPR4,GPR6)    ; data[i+1] =
```

FIG. 8A

```
VIRTUAL REGISTER (NUMBER OF APPEARANCES IN DESTINATION)
-> ARCHITECTURAL REGISTER

FPR_0967(2) -> FPR8
FPR_0980(2) -> FPR6
FPR_0981(2) -> FPR4
FPR_0987(2) -> FPR4
FPR_0978(4) -> FPR2
FPR_0977(4) -> FPR0
```

FIG. 8B

```
// FPR1, FPR3, FPR5, FPR7
// have been assigned by global register allocator
// FPRxx is architectural register
// FPR_09xx is virtual floating-point register
...
1   0x20061ae4ece   LD     FPR11,0(GPR4,GPR7)      ;
2   0x20061ae4ed2   LD     FPR13,24(GPR10,GPR6)    ;
3   0x20061ae4ed6   LD     FPR9,0(GPR10,GPR8)      ;
4   0x20061ae4eda   LDR    FPR0,FPR13              ;
5   0x20061ae4edc   LDR    FPR6,FPR2               ;
6   0x20061ae4ede   MDBR   FPR9, FPR3              ;
7   0x20061ae4ee2   MDBR   FPR13, FPR1             ;
8   0x20061ae4ee6   MDBR   FPR0, FPR3              ;
9   0x20061ae4eea   MDBR   FPR6, FPR1              ;
10  0x20061ae4eee   SDBR   FPR9,FPR13              ;
11  0x20061ae4ef2   ADBR   FPR0,FPR6               ;
12  0x20061ae4ef6   SDBR   FPR11,FPR2              ;
13  0x20061ae4efa   STD    FPR11,0(GPR10,GPR8)     ;
14  0x20061ae4efe   LD     FPR4,24(GPR4,GPR6)      ;
15  0x20061ae4f02   SDBR   FPR4,FPR0               ;
16  0x20061ae4f06   STD    FPR4,24(GPR10,GPR6)     ;
17  0x20061ae4f0a   ADB    FPR9,0(GPR4,GPR7)       ;
18  0x20061ae4f10   STD    FPR9,0(GPR4,GPR7)       ;
19  0x20061ae4f14   ADB    FPR0,24(GPR4,GPR6)      ;
20  0x20061ae4f1a   STD    FPR0,24(GPR4,GPR6)      ;
```

FIG. 9A

```
VIRTUAL REGISTER (NUMBER OF APPEARANCES IN DESTINATION)
-> ARCHITECTURAL REGISTER

FPR_0967(2) -> FPR13
FPR_0980(2) -> FPR6
FPR_0981(2) -> FPR11
FPR_0987(2) -> FPR4
FPR_0978(4) -> FPR9
FPR_0977(4) -> FPR0
```

FIG. 9B

ALLOCATION METHOD, APPARATUS, AND PROGRAM FOR MANAGING ARCHITECTURAL REGISTERS AND PHYSICAL REGISTERS USING MAPPING TABLES

CROSS-REFERENCE TO RELATED APPLICATION

This application is a continuation of U.S. patent application Ser. No. 14/321,852, filed Jul. 2, 2014, which claims the benefit of priority from Japanese Patent Application No. 2013-150697 filed Jul. 19, 2013, the contents of which are incorporated herein by reference.

BACKGROUND OF THE INVENTION

The present invention relates to an allocation technique for an architectural register in a system having one or more mapping tables that manage relations between architectural registers and physical registers.

A high performance processor, such as POWER7 (registered trademark) processor or z/Architecture (registered trademark) EC12 processor of IBM or Sandy Bridge processor of Intel, includes physical registers along with architectural registers visible to programmers and compliers; the number of physical registers (for example, 80 in z/Architecture, registered trademark, EC12 processor) being more than the number of architectural registers (for example, 16 in z/Architecture, registered trademark, EC12 processor). Such a processor increases parallelism among instructions and improves performance by executing operations in the processor using the physical registers outnumbering the architectural registers. Specifically, the processor reserves a physical register on a pipeline at the time of issuing an instruction and assigns the reserved physical register to an architectural register appearing in a destination operand of the instruction. The processor transfers the value of the physical register to the corresponding architectural register at the time of completing the instruction and then frees that physical register. This avoids false dependency between instructions arising from the reuse of architectural registers in a program and enables the processor to execute instructions out-of-order.

Mapping between architectural registers and physical registers is called register renaming and is performed by a register renaming mapper in a processor using a mapping table. One entry in the mapping table corresponds to one physical register. When the mapping table is full of the entries, the physical registers become unavailable. When the physical registers are unavailable, it is impossible to continue executing instructions placed in a pipeline and a pipeline stall occurs. This results in reduced performance.

In traditional processor designing, entries in a mapping table can be assigned to any architectural register. However, because of increased complication in processor designing in recent years, a processor has emerged that imposes a condition on an architectural register to which an entry is to be assigned. In the present specification an entry group having the same assignment rule imposed on architectural registers is referred to as "physical register management group." The physical register management group can be regarded as a group that determines how the entries in a mapping table should be used.

An example of a processor includes two physical register management groups G0 and G1 to one mapping table. The physical register management group G0 manages entries in the first half of the mapping table and assigns them to architectural registers with the least significant bit 0. The physical register management group G1 manages entries in the latter half of the mapping table and assigns them to architectural registers with the least significant bit 1. Other than the above-described processor, various designed processors can emerge such as a processor that includes a plurality of mapping tables each having one physical register management group, the physical register management groups managing entries to be managed with mutually different assignment rules.

When a processor that includes a plurality of physical register management groups in the whole mapping table or tables is used, the pipeline stall problem is severe. For example, a case where one mapping table includes two physical register management groups, G0 and G1 as described above, is discussed below. In that case, if the architectural registers with the least significant bit 1 are frequently used in a sequence of instructions, the latter half of the mapping table managed by the physical register management group G1 is full of the entries and, although there is a vacancy in the entries in the first half, the physical registers become unavailable. As a result, the performance of the processor decreases.

Below are described literatures found in a prior art search for the present invention.

Japanese Unexamined Patent Application No. 2011-181114 discloses a technique of assigning the same actual register to the same virtual register and assigning different actual registers to mutually different virtual registers with respect to a plurality of virtual registers appearing in a program part and of assigning a register different from an actual register assigned to a variable having a live range extending across the program part in a source program.

Japanese Unexamined Patent Application No. 5-158707 discloses a technique of calculating utilization in which the usage efficiency of an actual register is converted into numerical form for each execution unit at the time of allocating an actual register on an object code to a virtual register on an intermediate code for each execution unit and setting the number of actual registers being allocation targets in accordance with the utilization.

Japanese Unexamined Patent Application No. 5-20089 discloses a technique of setting an actual register table that indicates usage conditions of actual registers that should be used in assembly processing and a virtual register table that indicates usage conditions of virtual registers to the actual registers and, when a register is specified in an assembler instruction, causing a processing device to search the virtual register table to check the usage conditions of the actual registers on the basis of information described in the virtual register table and causing the processing device to assign actual registers to be used and to perform processing such as saving or restoring a register value already set in an actual register.

Japanese Unexamined Patent Application No. 2011-18120 discloses a technique relating to an information processing device implementing a register renaming scheme for managing a plurality of physical registers coordinated with a plurality of logical registers in conjunction with a renaming table. In the technique, a dedicated instruction is incorporated into an instruction set so that a physical register coordinated with a logical register designated by the dedicated instruction is released to be free and an optimization is performed to change the number of software available registers within the plurality of logical registers and the number of renaming registers within the plurality of physical registers in conformity with the software executing the instruction set.

The Japanese Unexamined Patent Applications discussed above disclose the techniques relating to allocating physical registers. However, none of the techniques described in the literatures deal with a processor having a plurality of physical register management groups as the whole mapping table or tables and those techniques cannot reduce a decrease in performance caused by pipeline stalls occurring during execution resulting from a state where the physical registers become unavailable. "Coloring Heuristics for Register Allocation" by Briggs et al. 1989 is background art that discloses a method of determining live ranges of a plurality of registers.

SUMMARY OF THE INVENTION

Accordingly, one aspect of the present invention provides a computer-implemented method for allocating an architectural register in a computer, wherein the computer includes a processor having an at least one or more mapping tables that manage relations between a plurality of architectural registers and a plurality of physical registers, the method including: detecting at least one or more available architectural registers to an allocation target virtual register; identifying a plurality of adjacent instructions to each of all instructions having the allocation target virtual register in a destination operand; counting a number of uses of an architectural register appearing in the destination operand for each of the architectural registers for the identified plurality of adjacent instructions; summing the numbers of uses of the architectural registers for each of an entry group having a same assignment rule for correlation with the architectural registers in the at least one or more mapping tables to calculate a total of the numbers of uses of entries for the entry group; and selecting the architectural register to be allocated to the allocation target virtual register among the detected plurality of available architectural registers.

Another aspect of the present invention provides a computer program product for allocating an architectural register, the computer program product including a computer readable storage medium having program instructions embodied therewith, wherein the computer readable storage medium is not a transitory signal per se, the program instructions readable/executable by a computer device to cause the computer device to perform the method described above.

Another aspect of the present invention provides an allocation system for allocating an architectural register, the allocation system including: a memory; a processor communicatively coupled to the memory; and an allocation module coupled to the memory and the processor, wherein the allocation module is configured to perform the method described above.

BRIEF DESCRIPTION OF THE DRAWINGS

FIG. 3 is an illustration for describing adjacent instructions to an instruction in a program code according to an embodiment of the present invention.

FIG. 4A illustrates an example relationship between a mapping table and physical register management groups according to an embodiment of the present invention.

FIG. 4B illustrates another example relationship between mapping tables and physical register management groups according to an embodiment of the present invention.

FIG. 6 illustrates a source code used in an experiment in the present invention.

FIG. 7 illustrates a sequence of machine instructions as a result of compiling the source code illustrated in FIG. 6.

FIG. 8A illustrates a result of allocating architectural registers for the sequence of instructions illustrated in FIG. 6 using a traditional technique.

FIG. 8B illustrates the result of allocating architectural registers for the sequence of instructions illustrated in FIG. 6 using the traditional technique.

FIG. 9A illustrates a result of allocating architectural registers for the sequence of instructions illustrated in FIG. 6 by optimization of the present invention.

FIG. 9B illustrates the result of allocating architectural registers for the sequence of instructions illustrated in FIG. 6 by optimization of the present invention.

DETAILED DESCRIPTION OF THE PREFERRED EMBODIMENT

Technical Problem

Figure 1:
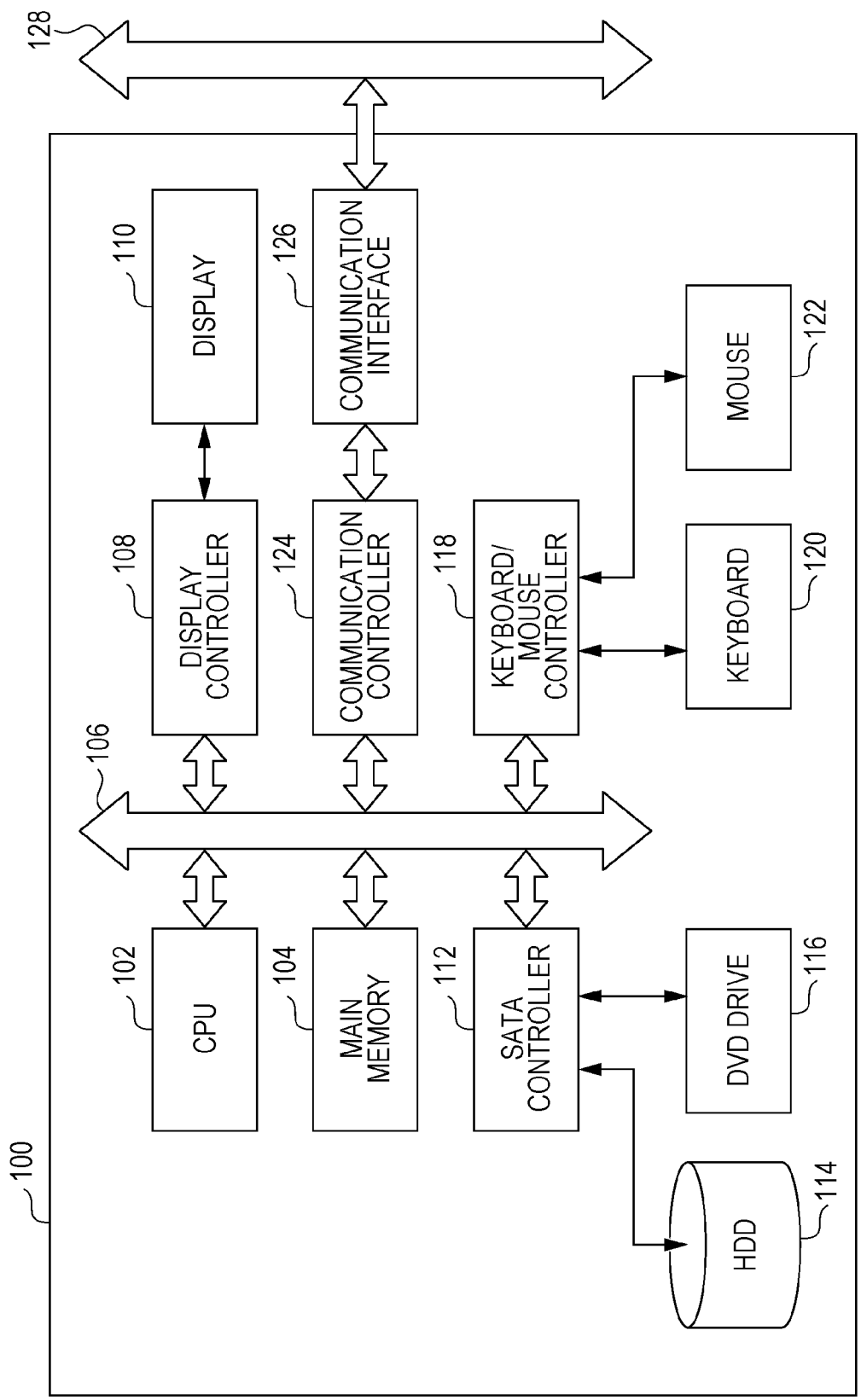
FIG. 1 illustrates an example of a hardware configuration of a computer system suitable for implementing an allocation system according to an embodiment of the present invention.

The invention is made to solve the above-described problem. An object of the present invention is to provide an allocation technique for an architectural register in a processor having a plurality of physical register management groups as the whole mapping table or tables, the technique capable of reducing the number of pipeline stalls occurring during execution resulting from a state where physical registers become unavailable.

Solution to Problem

The present invention achieves the above object in the following allocation method for an architectural register in a computer that includes a processor having one or more mapping tables that manage relations between architectural registers and physical registers. Such an allocation method includes: a step of, by the computer, detecting one or more available architectural registers to an allocation target virtual register; a step of, by the computer, identifying adjacent instructions to each of all instructions having the allocation target virtual register in a destination operand on condition that the plurality of available architectural registers are detected; a step of counting, by the computer, a number of uses of an architectural register appearing in the destination operand for each of the architectural registers for the identified group of adjacent instructions; a step of, by the computer, summing the numbers of uses of the architectural registers for each entry group having the same assignment rule for correlation with the architectural registers in the one or more mapping tables to calculate a total of the numbers of uses of entries for the entry group; and a step of, by the computer, selecting the architectural register to be allocated to the allocation target virtual register among the detected plurality of available architectural registers such that the total of the numbers of uses of entries for each entry group in the one or more mapping tables approaches uniformity.

The computer can preferably detect an architectural register having a live range that does not overlap each live range of other architectural registers as the available architectural register to the allocation target virtual register.

The computer can preferably identify a set of instructions as the adjacent instructions and duration of use of the architectural register in the destination operand of each of the instructions in the set can partially or fully overlap duration of use of the architectural register assigned to the allocation target virtual register. The duration of use of the architectural register can be determined in advance for each of types of the instructions.

Alternatively, the computer can identify a predetermined number of instructions around each of the instructions having the allocation target virtual register in the destination operand as the adjacent instructions.

The computer can preferably select the architectural register satisfying the assignment rule for the entry group with the smallest number of uses of entries among the detected plurality of architectural registers.

Here, in the computer, a plurality of entry groups having the same assignment rule for correlations with architectural registers can be present for one mapping table. Alternatively, the processor can have a plurality of mapping tables and one entry group having the same assignment rule for correlations with architectural registers can be present for each of the mapping tables.

The present invention is described above as the method for allocating an architectural register. The present invention can also be grasped as a program for allocating an architectural register, the program causing the computer to perform the method and also as an apparatus/system for allocating an architectural register achieved by installing such a program into the computer.

Advantageous Effects of Invention

According to the present invention, in allocating an architectural register, the number of uses of an architectural register in instructions adjacent to an instruction that uses an allocation target virtual register is determined for each architectural register. The numbers of uses of each architectural register are summed for each entry group having the same assignment rule for correlation with the architectural registers in one or more mapping tables. The total of the numbers of uses of the entries for each entry group in the mapping tables is calculated. As a result, among the available architectural registers, the architectural register at which the total of the numbers of uses of entries for each entry group in the mapping tables approaches uniformity can be selected for the allocation target virtual register. Thus the present invention can provide the advantageous effect of reducing the number of pipeline stalls occurring during execution resulting from a state where physical registers become unavailable. The other advantageous effects in the present application invention will be understandable from the description of the embodiment.

An embodiment of the present invention is described below on the basis of the drawings. The embodiment below does not limit the invention relating to the claims. Not all of the combinations of the characteristics described in the embodiment are necessary in order to provide a solution to the problem. The same elements have the same reference numerals throughout the description of the embodiment.

FIG. 1 illustrates an example hardware configuration of a computer system 100 suitable for implementing the present invention. The computer system 100 includes a main central processing unit (CPU) 102 and a main memory 104, both of which are connected to a bus 106. The CPU 102 can be preferably based on a 32-bit or 64-bit architecture and can be targeted for a processor having a plurality of groups that determine how the entries in a mapping table can be used as the whole mapping table or tables. Examples of such a processor can include a POWER7 (registered trademark) processor and z/Architecture (registered trademark) EC12 processor of IBM and Sandy Bridge processor of Intel. The main memory 104 can preferably have a capacity of 1 GB or more and more preferably, a capacity of 2 GB or more.

The bus 106 is connectable to a display 110, for example, a liquid crystal display (LCD) through a display controller 108. The display 110 is used to display, using an appropriate graphical interface, information about a computer connected to a network through communication lines and information about software running on the computer to manage the computer.

The bus 106 is also connectable to a disk 114, for example, a silicon disk or hard disk through a serial advanced technology attachment (SATA) or integrated drive electronics (IDE) controller 112. The bus 106 is also optionally connectable to a drive 116, for example, a compact disk (CD), digital versatile disk (DVD), or blu-ray disk (BD) drive. The bus 106 is further optionally connectable to a keyboard 120 and a mouse 122 through a keyboard/mouse controller 118 or a universal serial bus (USB) (not illustrated), and those are not necessary for implementing the present invention.

The disk 114 stores an operating system, such as LINUX (registered trademark), Windows (registered trademark) operating system provided by Microsoft Corporation, Mac OS (registered trademark) or iOS (registered trademark) provided by Apple Inc., or Unix (registered trademark) system included in X Window System (e.g., AIX (registered trademark) provided by International Business Machines Corporation (registered trademark)), such that the operating system can be loaded into the main memory 104.

The disk 114 can store a computer program for supplying the CPU 102 with an instruction in cooperation with the operating system and for implementing the present invention. That is, the disk 114 can store an architectural register allocation program and its related data, the program installed in the computer system 100 and functioning as an architectural register allocation apparatus/system according to the embodiment of the present invention.

The architectural register allocation program includes a detecting module, an identifying module, a counting module, a total number calculating module, and a selecting module. Those modules act on the CPU 102 and cause the computer system 100 to function as a detecting section 202, an identifying section 204, a counting section 206, a total number calculating section 208, and a selecting section 210, which are described below. The present invention can be dynamic or static and is implementable as part of the functions of a compiler.

The above-described computer program can be compressed or divided into a plurality of sections and it can be recorded in a plurality of media. The drive 116 is usable to install a program into the disk 114 from a CD-read-only memory (CD-ROM), DVD-ROM, or BD as needed.

A communication interface 126 can conform to, for example, Ethernet (registered trademark) protocol. The communication interface 126 is connected to the bus 106 through a communication controller 124, serves to physically connect the computer system 100 to a communication line 128, and provides the TCP/IP communication protocol of the communication function of the operating system of the computer system 100 with a network interface layer. The communication line can be based on the wired local area network (LAN) environment or wireless LAN environment, for example, the Wi-Fi standards, such as IEEE 802.11a/b/g/n.

From the above, it will be easily understood that the computer system 100 used in the embodiment of the present invention is implemented by a normal information processing apparatus, such as a personal computer, or workstation, mainframe or a combination thereof. The elements described above are merely illustrative and not all of the elements are essential elements for the present invention.

Figure 2:
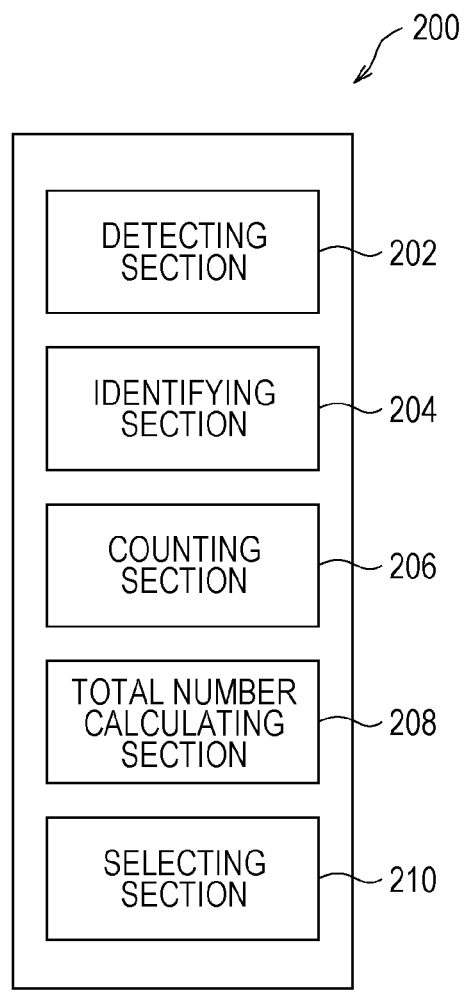
FIG. 2 is a functional block diagram of the allocation system according to an embodiment of the present invention.

FIG. 2 is a functional block diagram of an allocation system 200 according to the embodiment of the present invention. The allocation system 200 includes the detecting section 202, the identifying section 204, the counting section 206, the total number calculating section 208, and the selecting section 210.

The detecting section 202 detects an available architectural register to an allocation target virtual register. More specifically, the detecting section 202 detects an architectural register having a live range that does not overlap each live range of other architectural registers as the available architectural register to the allocation target virtual register.

The determination of whether there is an overlap between the live ranges is described below.

1. An interval from when an allocation target virtual register is first defined in a program part that is a compiling target or the whole program to when it is last referred to is determined.

2. Similarly, for each architectural register, an interval from when it is first defined in a program part that is a compiling target or the whole program to when it is last referred to is determined.

3. The intervals determined in the above 1 and 2 are compared. If there is an overlap therebetween, it is determined that the live ranges overlap each other. If there is no overlap, it is determined that the live ranges do not overlap each other.

A method for determining an overlap between live ranges is a known technique (see, for example, Japanese Unexamined Patent Application No. 2011-181114). That technique is not the main topic of the present invention and is not described here.

The identifying section 204 identifies adjacent instructions to each of all instructions having an allocation target virtual register in a destination operand on condition that the detecting section 202 detects a plurality of available architectural registers. Here, an instruction having an allocation target virtual register in a source operand is not a target because the architectural register specified in the source operand is only used in reading the content of that architectural register and does not consume an entry in a mapping table.

Here, the adjacent instructions are a set of instructions in which duration of use of an architectural register in a destination operand of each of the instructions at least in part overlaps duration of use of an architectural register assigned to an allocation target virtual register. The duration of use of the architectural register is a period of time from when a physical register is assigned to the architectural register by a register renaming mapper in a processor to when the physical register is freed. It is to be noted that adjacent instructions identified does not vary depending on the architectural register assigned to an allocation target virtual register.

The duration of use of an architectural register can be precisely found by, for example, tentatively assigning an architectural register to an allocation target virtual register, conducting a processor simulation, and determining whether there is an overlap between the durations of uses. In place of that, the duration of use of an architectural register can be determined using values obtained in an investigation in advance for each of the types of instructions based on the processor specifications. Moreover, the adjacent instructions can be a predetermined number of instructions around each instruction having an allocation target virtual register in a destination operand (excluding an instruction in which an architectural register has not yet been assigned and an instruction having no destination register).

Here, a case where adjacent instructions consists of three instructions around an instruction having an allocation target virtual register in a destination operand is described with reference to a pseudo code illustrated in FIG. 3. In the pseudo code illustrated in FIG. 3, the virtual register of an allocation target virtual register is FPR_0981. The architectural registers FPR0 to 13 are available in register allocation. The live range of the virtual register FPR_0981 overlaps that of each of the architectural registers FPR0, 1, 3, 5, 7, and 9, but does not overlap that of each of the architectural registers FPR2, 4, 6, 8, 10, 11, 12, and 13. Thus it is necessary to select an optimal architectural register among the FPR2, 4, 6, 8, 10, 11, 12, and 13. In FIG. 3, FPR_09xx indicates a virtual floating-point register, FPRxx indicates an architectural register, and a number at the beginning of a line indicates a line number. The same notational system is used in FIGS. 7, 8A, 8B, 9A, and 9B, which are described below.

In the pseudo code illustrated in FIG. 3, all instructions each having the virtual register FPR_0981 in a destination operand are an LD instruction in the line number 1 and an SDBR instruction in the line number 12. It is to be noted that an STD instruction in the line number 13 is an instruction having no destination register. Because the LD instruction in the line number 1 is the start instruction, its adjacent instructions is estimated at subsequent three instructions. However, an architectural register has not yet been allocated to an LD instruction in the line number 2, the adjacent instructions are an LD instruction in the line number 3 and an LDR instruction in the line number 4, both of which are underlined.

The adjacent instructions to the SDBR instruction in the line number 12 are a set of three instructions around it, the set excluding an instruction to which an architectural register has not yet been allocated. That is, the adjacent instructions to the SDBR instruction in the line number 12 are an SDBR instruction in the line number 10, an ADBR instruction in the line number 11, an LD instruction in the line number 14, and an SDBR instruction in the line number 15.

The counting section 206 counts the number of uses of the architectural register appearing in a destination operand for each architectural register with respect to the adjacent instructions identified by the identifying section 204.

The counting is described below using the above-described pseudo code illustrated in FIG. 3 as an example. As described above, the adjacent instructions to the LD instruction in the line number 1 are the LD instruction in the line number 3 and the LDR instruction in the line number 4, whereas the adjacent instructions to the SDBR instruction in the line number 12 are the SDBR instruction in the line number 10, the ADBR instruction in the line number 11, the LD instruction in the line number 14, and the SDBR instruction in the line number 15. When the number of uses of the architectural register appearing in the destination operand in each of the instructions is counted for each architectural register, that of FPR0 is two, that of FPR9 is two, and that of FPR4 is two.

The total number calculating section 208 calculates the total of the numbers of uses of management target entries by summing the numbers of uses of the architectural registers counted for each architectural register by the counting section 206 for each entry group having the same assignment rule for correlation with the architectural registers, that is, for each physical register management group, in one or more mapping tables. At this time, assigning the numbers of uses of an architectural register to a physical register management group depends on the processor specifications, more specifically, on the assignment rule for management target entries in the physical register management group. That is, because the physical register management group determines how the entries in a mapping table can be used, the numbers of uses of all architectural registers conforming to how they can be used are summed and the result is the total of the numbers of uses of the management target entries. The total number calculating section 208 can have the processor specifications or can read them from a predetermined file at startup.

Here, relationships between physical register management groups and mapping tables are described with reference to FIGS. 4A and 4B. In the example illustrated in FIG. 4A, for one mapping table 400, a plurality of physical register management groups 402 and 404 for managing different entry portions in the mapping table 400 are present. In the example illustrated in FIG. 4B, a processor has a plurality of mapping tables 406 and 410, for each of which one physical register management group for managing all entries is present (a physical register management group 408 is present for the mapping table 406, and a physical register management group 412 is present for the mapping table 410).

The physical register management groups 402 and 408 assign their management target entries to architectural registers with the least significant bit 0. The physical register management groups 404 and 412 assign their management target entries to architectural registers with the least significant bit 1. In both cases, one entry in a mapping table corresponds to one physical register.

Assuming that the physical register management groups and the mapping table have the relationship illustrated in FIG. 4A, when the pseudo code in FIG. 3 is used, the total of the numbers of uses of management target entries is calculated by summing the numbers of uses of the architectural registers counted for each architectural register for each physical register management group. As described above, the number of uses of each architectural register FPR0 is two, that of FPR9 is two, and that of FPR4 is two. Because numbers of architectural registers FPR0 and FPR4 have the least significant bit 0, they satisfy the assignment rule for management target entries in the physical register management group 402. Because a number of the architectural register FPR9 has the least significant bit 1, it satisfies the assignment rule for management target entries in the register management group 404. Accordingly, the total of the numbers of uses of the management target entries in the register management group 402 is four, which is obtained by summing two for FPR0 and two for FPR4. The total of the numbers of uses of the management target entries in the register management group 404 is two, which corresponds to FPR9.

The selecting section 210 selects an architectural register to be assigned to an allocation target virtual register among a plurality of detected available architectural registers such that the total of the numbers of uses of management target entries for each entry group, that is, for each physical register management group, in one or more mapping tables approaches uniformity. In one example case, the selecting section 210 selects an architectural register that satisfies the assignment rule for that management target entry in the physical register management group at which the number of uses of entries is the smallest among the detected plurality of architectural registers.

A selection method of architectural registers in the selecting section 210 is specifically described using the foregoing example. As previously described, for the virtual register FPR_0981, which is an allocation target, eight available architectural registers of FPR2, 4, 6, 8, 10, 11, 12, and 13 are present. It is necessary to select an optimal architectural register among them. The total of the numbers of uses of entries for the register management group 402 is four, whereas that for the register management group 404 is two. Accordingly, the architectural register satisfying the assignment rule for management target entries of the register management group 404, which has the smallest number of uses of entries, is the optimal architectural register. The assignment rule for management target entries of the register management group 404 is that the architectural registers have the least significant bit 1. Thus the optimal architectural register to be allocated to the virtual register FPR_0981 is FPR11 or FPR13.

Figure 5:
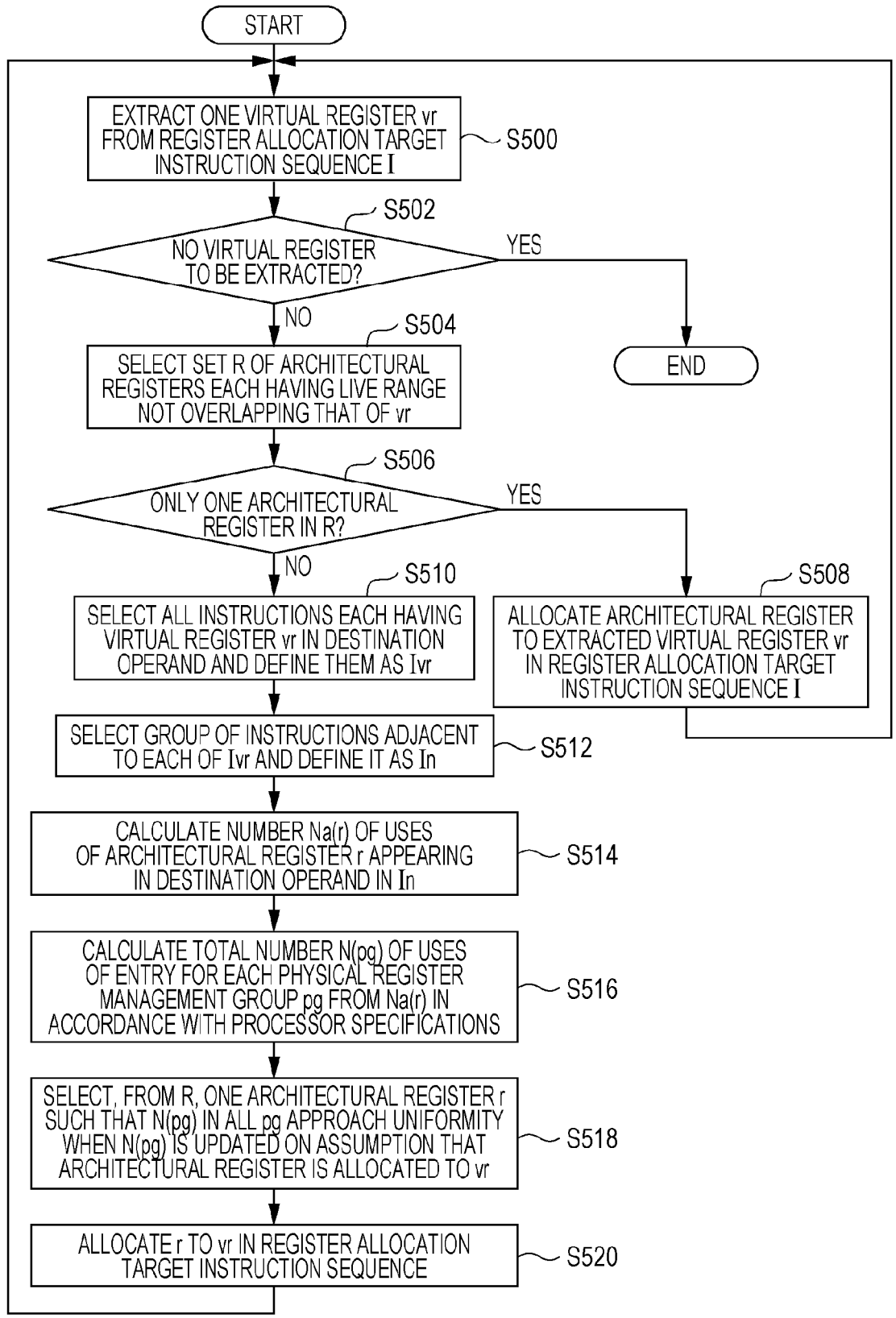
FIG. 5 is a flowchart that illustrates an example allocation process according to the embodiment of the present invention.

Next, operations of the allocation system 200 are described with reference to FIG. 5. FIG. 5 is a flowchart that illustrates an example allocation process according to the embodiment of the present invention. The process starts at step 500, where the allocation system 200 reads a compiled program into the memory and extracts one virtual register vr from a register allocation target instruction sequence I. If there is no virtual register vr to be extracted (YES at step 502), the process is completed. If there is a virtual register vr to be extracted (NO at step 502), then the allocation system 200 selects a set R of architectural registers each having a live range that does not overlap that of the virtual register vr (step 504).

Then the allocation system 200 determines whether the selected set R has only one architectural register (step 506). If there is only one architectural register in the set R (YES at step 506), the allocation system 200 allocates the architectural register in the set R to the virtual register vr in the register allocation target instruction sequence I (step 508). Then the process returns to step 500.

If there is not only one architectural register in the set R, that is, there are a plurality of architectural registers (NO at step 506), the allocation system 200 selects all instructions each having the virtual register vr in the destination operand from the register allocation target instruction sequence I and defines them as Ivr (step 510). Then the allocation system 200 identifies adjacent instructions to each of all the selected instructions Ivr and defines the identified adjacent instructions as instructions In (step 512). Then the allocation system 200 calculates the number Na(r) of uses of an architectural register r appearing in the destination operand in each of the instructions In (step 514). Here, the number Na(r) is the number of appearances of the architectural register r in the destination operand in each of the instructions In.

Then the allocation system 200 calculates the total number N(pg) of uses of management target entries by summing the numbers Na(r) of uses of the architectural register r for each physical register management group pg in accordance with the processor specifications, more specifically, with the assignment rule for management target entries of the physical register management group pg (step 516). Then the allocation system 200 selects, from the set R, the architectural register r such that, on the assumption that one architectural register in the set R selected at step 504 is allocated to the allocation target virtual register vr, when the total number N(pg) of uses of the management target entries in the corresponding physical register management group pg is updated the total number N(pg) of uses of management target entries in all the physical register management groups pg approaches uniformity (step 518).

Then the allocation system 200 allocates the architectural register r in the set R selected at step 518 to the allocation target virtual register vr (step 520). Then the process returns to step 500.

A result of an experiment of the present invention is described with reference to FIGS. 6 to 9B. The code illustrated in FIG. 6 is a source code for an experimental program. The code illustrated in FIG. 7 is a sequence of machine instructions having virtual floating-point registers obtained by compilation of a part (7th to 16th lines) of the source code illustrated in FIG. 6 performed by a just-in-time (JIT) compiler. In the experiment, architectural registers were allocated by applying a traditional technique and the technique of the present invention to the sequence of machine instructions and the instructions were executed by a simulator on a pipeline processor having two mapping tables table0 and table 1. In the execution by the simulator, each of the two mapping tables has one physical register management group. When a number of the architectural register has the least significant bit 0, the mapping table table0 was used. When a number of the architectural register has the least significant bit 1, the mapping table table1 was used.

The code illustrated in FIG. 8A is a result of allocating architectural registers to virtual registers by applying the traditional technique to the sequence of machine instructions illustrated in FIG. 6. FIG. 8B illustrates only the result of allocation in FIG. 8A. The code illustrated in FIG. 9A is a result of allocating architectural registers to virtual registers by applying the technique of the present invention to the sequence of machine instructions illustrated in FIG. 6. FIG. 9B illustrates only the result of allocation in FIG. 9A.

In the allocation of architectural registers by the traditional technique, no consideration was given to how the entries in the mapping tables can be used. Thus as illustrated in FIG. 8B, only the architectural registers each having the least significant bit 0 in the destination operand were allocated to virtual registers. In the sequence of instructions illustrated in FIG. 8A, the number of appearances of the architectural registers with the least significant bit 0 is 16 and the number of appearances of the architectural registers with the least significant bit 1 is 0.

In contrast, in the allocation of architectural registers in the present invention, how the entries in mapping tables can be used is taken into consideration such that the mapping tables table0 and table1 are used in balance. Thus as illustrated in FIG. 9B, the architectural registers having the least significant bit 1 were allocated to the virtual registers FPR_0967, FPR_0981 and FPR_0978, to which numbers of the architectural register having the least significant bit 0 were allocated in the traditional technique. In the sequence of instructions illustrated in FIG. 9A, the number of appearances of the architectural registers with the least significant bit 0 reduces from 16 to 8 and the number of appearances of the architectural registers with the least significant bit 1 increases from 0 to 8. In comparison with the execution of the sequence of instructions illustrated in FIG. 8A, the sequence of instructions illustrated in FIG. 9A reduced the execution cycle by 13%. One of the major reasons for that reduction can be that in the execution of the sequence of instructions illustrated in FIG. 8A, only the mapping table table0 is used and becomes full of entries and pipeline stalls frequently occur, whereas in the execution of the sequence of instructions illustrated in FIG. 9A, the mapping tables table0 and table1 are used in balance and pipeline stalls resulting from a state where physical registers become unavailable are reduced.

The present application invention is described above using the embodiment, and the technical scope of the present application invention is not limited to the range of the above description of the embodiment. It is apparent to those skilled in the art that various changes or improvements can be added to the above-described embodiment. As described above, the forms in which changes or improvements are added to the above-described embodiment are included in the technical scope of the present invention.

It is to be noted that, for the orders of executing processing, such as operations, processes, steps, and stages, in the apparatus, system, program, and method illustrated in the claims, specification, and drawings, "in advance of," "previous to" or similar expressions are not clearly described and processing can be performed in any order unless an output in preceding processing is used in subsequent processing. It is to be noted that even if the output in preceding processing is used in subsequent processing, another processing can be performed between the preceding processing and the subsequent processing or even if there is a description that another processing is performed there between, the preceding processing can be changed such that it is performed immediately before the subsequent processing. In the claims, specification, and operational flow in the drawing, although "first," "next," and "then," and other similar expressions can be used in the description for the sake of convenience, this may not necessarily mean that performing the operations in that order is required.

I claim:

1. A computer-implemented method for allocating an architectural register in a computer, wherein the computer includes a processor having an at least one or more mapping tables that manage relations between a plurality of architectural registers and a plurality of physical registers, the method comprising:

detecting at least one or more available architectural registers to an allocation target virtual register;

identifying a plurality of adjacent instructions to each of all instructions having the allocation target virtual register in a destination operand;

counting a number of uses of an architectural register appearing in the destination operand for each of the architectural registers for the identified plurality of adjacent instructions;

summing the numbers of uses of the architectural registers for each of an entry group having a same assignment rule for correlation with the architectural registers in the at least one or more mapping tables to calculate a total of the numbers of uses of entries for the entry group; and selecting the architectural register to be allocated to the allocation target virtual register among the detected plurality of available architectural registers.

2. The computer-implemented method according to claim 1, wherein an architectural register having a live range that does not overlap each live range of an other architectural register is detected as the available architectural register to the allocation target virtual register.

3. The computer-implemented method according to claim 2, wherein a set of instructions is identified as the adjacent instructions and a duration of use of the architectural register in the destination operand of each of the instructions in the set partially or fully overlaps the duration of use of the architectural register assigned to the allocation target virtual register.

4. The computer-implemented method according to claim 3, wherein the duration of use of the architectural register is determined in advance for each of the types of the instructions.

5. The computer-implemented method according to claim 2, wherein a predetermined number of instructions around each of the instructions having the allocation target virtual register in the destination operand is identified as the adjacent instructions.

6. The computer-implemented method according to claim 1, wherein the computer selects the architectural register satisfying an assignment rule for the entry group with a smallest number of uses of entries among the detected plurality of architectural registers.

7. The computer-implemented method according to claim 1, wherein a plurality of entry groups having the same assignment rule for correlations with architectural registers are present for one mapping table.

8. The computer-implemented method according to claim 1, wherein the processor has a plurality of mapping tables and one entry group having the same assignment rule for correlations with architectural registers is present for each of the mapping tables.

9. A computer program product for allocating an architectural register, the computer program product comprising a non-transitory computer readable storage medium having program instructions embodied therewith which, when executed, cause a computer device to perform the steps of a method comprising:

detecting at least one or more available architectural registers to an allocation target virtual register;

identifying a plurality of adjacent instructions to each of all instructions having the allocation target virtual register in a destination operand;

counting a number of uses of an architectural register appearing in the destination operand for each of the architectural registers for the identified plurality of adjacent instructions;

summing the numbers of uses of the architectural registers for each of an entry group having a same assignment rule for correlation with the architectural registers in the at least one or more mapping tables to calculate a total of the numbers of uses of entries for the entry group; and selecting the architectural register to be allocated to the allocation target virtual register among the detected plurality of available architectural registers.

10. The computer program product according to claim 9, wherein an architectural register having a live range that does not overlap each live range of an other architectural register is detected as the available architectural register to the allocation target virtual register.

11. The computer program product according to claim 10, wherein a set of instructions is identified as the adjacent instructions and a duration of use of the architectural register in the destination operand of each of the instructions in the set partially or fully overlaps the duration of use of the architectural register assigned to the allocation target virtual register.

12. The computer program product according to claim 11, wherein the duration of use of the architectural register is determined in advance for each of the types of the instructions.

13. The computer program product according to claim 10, wherein a predetermined number of instructions around each of the instructions having the allocation target virtual register in the destination operand is identified as the adjacent instructions.

14. The computer program product to claim 9, wherein the computer selects the architectural register satisfying an assignment rule for the entry group with a smallest number of uses of entries among the detected plurality of architectural registers.

15. The computer program product according to claim 9, wherein a plurality of entry groups having the same assignment rule for correlations with architectural registers are present for one mapping table.

16. The computer program product according to claim 9, wherein the processor has a plurality of mapping tables and one entry group having the same assignment rule for correlations with architectural registers is present for each of the mapping tables.

17. An allocation system for allocating an architectural register, the allocation system comprising:

a memory;

a processor communicatively coupled to the memory; and an allocation module coupled to the memory and the processor, wherein the allocation module is configured to perform the steps of a method comprising:

detecting at least one or more available architectural registers to an allocation target virtual register;

identifying a plurality of adjacent instructions to each of all instructions having the allocation target virtual register in a destination operand;

counting a number of uses of an architectural register appearing in the destination operand for each of the architectural registers for the identified plurality of adjacent instructions;

summing the numbers of uses of the architectural registers for each of an entry group having a same assignment rule for correlation with the architectural registers in the at least one or more mapping tables to calculate a total of the numbers of uses of entries for the entry group; and selecting the architectural register to be allocated to the allocation target virtual register among the detected plurality of available architectural registers.

18. The allocation system according to claim 17, wherein an architectural register having a live range that does not overlap each live range of an other architectural register is detected as the available architectural register to the allocation target virtual register.

19. The allocation system according to claim 18, wherein a set of instructions is identified as the adjacent instructions and a duration of use of the architectural register in the destination operand of each of the instructions in the set partially or fully overlaps the duration of use of the architectural register assigned to the allocation target virtual register.

20. The allocation system according to claim 19, wherein the duration of use of the architectural register is determined in advance for each of the types of the instructions.

* * * * *